(12) United States Patent
Min et al.

(10) Patent No.: US 9,531,205 B2
(45) Date of Patent: Dec. 27, 2016

(54) ALARM SYSTEM FOR POWER SUPPLY

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Jie Min, Wuhan (CN); Chun-Sheng Chen, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 80 days.

(21) Appl. No.: 14/564,695

(22) Filed: Dec. 9, 2014

(65) Prior Publication Data
US 2016/0126785 A1 May 5, 2016

(30) Foreign Application Priority Data
Oct. 31, 2014 (CN) .......................... 2014 1 0597961

(51) Int. Cl.
H02J 7/00 (2006.01)

(52) U.S. Cl.
CPC ............ *H02J 7/0031* (2013.01); *H02J 7/0047* (2013.01); *H02J 2007/005* (2013.01)

(58) Field of Classification Search
CPC ........ H02J 9/061; H02J 7/0047; H02J 7/0063; H02J 7/0031
See application file for complete search history.

(56) References Cited

U.S. PATENT DOCUMENTS 7,580,688 B2 * 8/2009 Jiang ..................... H02J 7/0047 455/127.1

* cited by examiner

*Primary Examiner* — Leon Flores
(74) *Attorney, Agent, or Firm* — Zhigang Ma

(57) ABSTRACT

An alarm system for power supply includes a power supply unit, an electronic device, a control unit, and a switch unit. The power supply unit includes a battery. The battery outputs a power supply voltage. The power supply receives a standby DC voltage, and outputs a first voltage level signal according to the standby DC voltage and the power supply voltage. The electronic device outputs a second voltage level signal. The control unit receives the first voltage level signal and the second voltage level signal, and outputs a control signal in accordance. The switch unit receives the control signal, and sounds alert when there is no electric charge in the battery.

16 Claims, 2 Drawing Sheets

ALARM SYSTEM FOR POWER SUPPLY

CROSS-REFERENCE TO RELATED APPLICATIONS

This application claims priority to Chinese Patent Application No. 201410597961.5 filed on Oct. 31, 2014, the contents of which are incorporated by reference herein.

FIELD

The subject matter herein generally relates to an alarm system for power supply.

BACKGROUND

Electronic devices such as personal computers usually have button cells which provide backup power supply when AC power is cut. The backup power supply keeps a clock circuit in the electronic device working normally.

BRIEF DESCRIPTION OF THE DRAWINGS

Implementations of the present technology will now be described, by way of example only, with reference to the attached figures.

DETAILED DESCRIPTION

Figure 1:
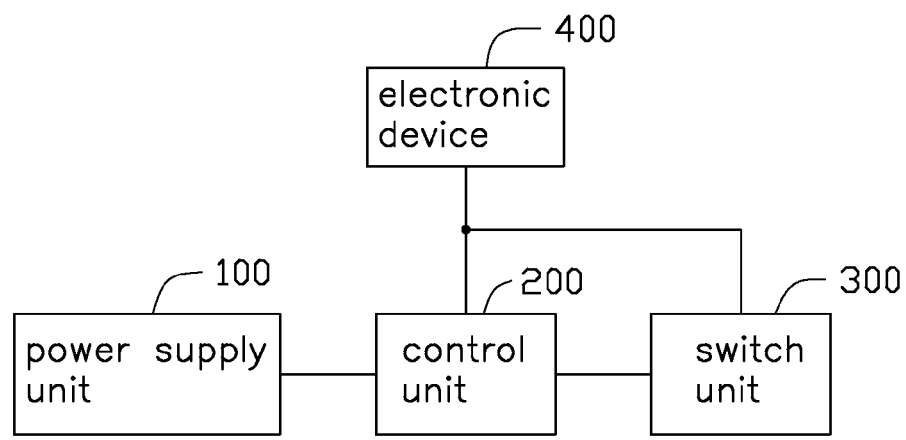
FIG. 1 is a block diagram of an embodiment of an alarm system for power supply.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

FIG. 1 illustrates an alarm system for power supply in accordance with an embodiment. The alarm system includes a power supply unit 100, a control unit 200, a switch unit 300, and an electronic device 400.

Figure 2:
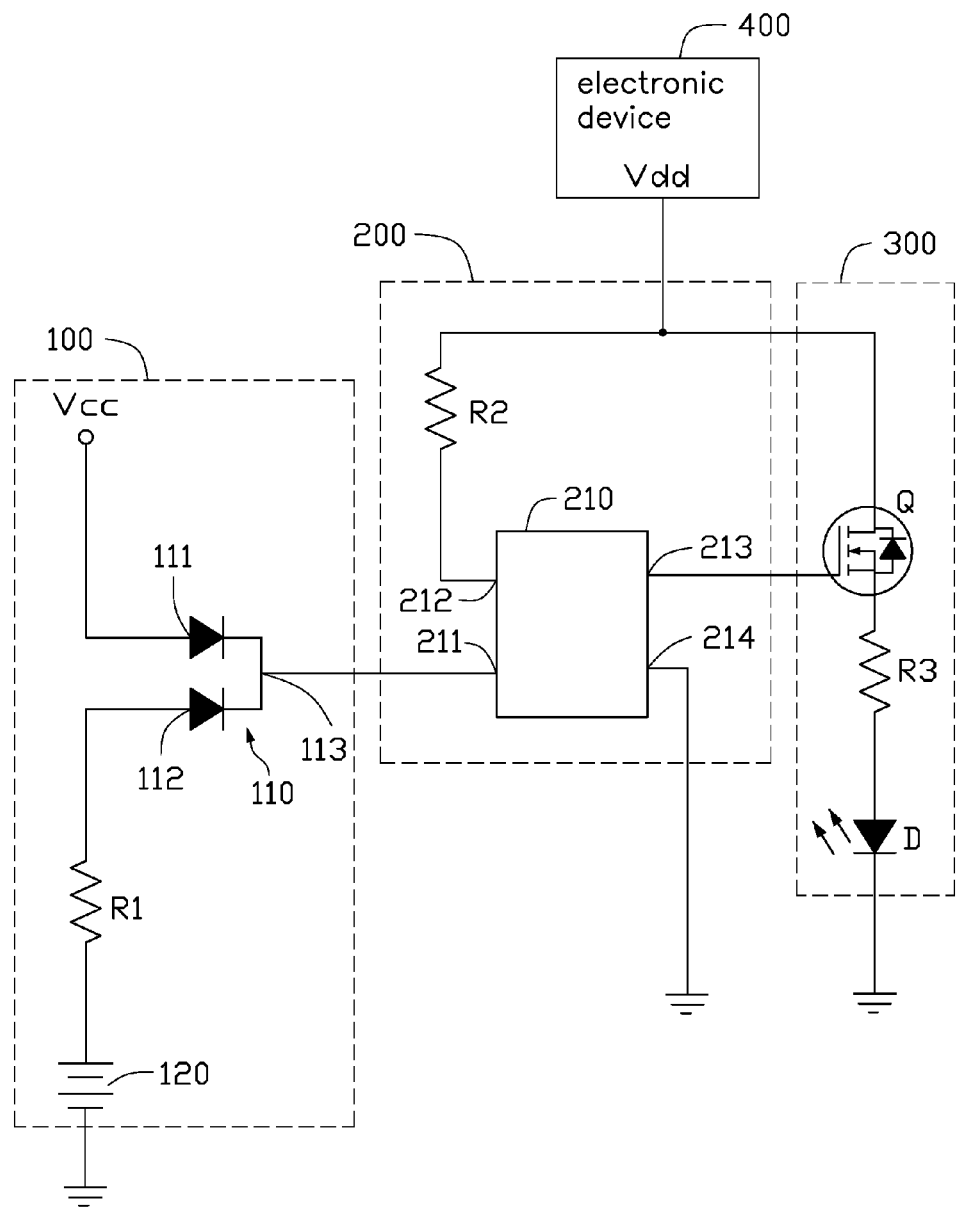
FIG. 2 is a circuit diagram of the alarm system for power supply of FIG. 1.

FIG. 2 illustrates that the power supply unit 100 includes a Schottky diode 110, a first resistor R1, and a battery 120. The Schottky diode 110 includes a first anode 111, a second anode 112, and a cathode 113. The first anode 111 is configured to receive a standby DC voltage Vcc. The second anode 112 is electrically coupled to an anode of the battery 120 via the first resistor R1. A cathode of the battery 120 is grounded. The cathode 113 is configured to output a first voltage level signal to the control unit 200. In at least one embodiment, the battery 120 is a button cell. The standby DC voltage Vcc is +3.3V.

The control unit 200 includes a control chip 210 and a second resistor R2. The control chip 210 includes a first input terminal 211, a second input terminal 212, an output terminal 213, and a ground terminal 214. The first input terminal 211 is electrically coupled to the cathode 113 and receives the first voltage level signal. The second input terminal 212 is electrically coupled to a power on DC voltage Vdd via the second resistor R2. The second input terminal 212 is configured to receive a second voltage level signal from the electronic device 400. The output terminal 213 is configured to output a control signal. The ground terminal 214 is grounded. In at least one embodiment, the power on DC voltage Vdd is +3V.

The switch unit 300 includes a MOSFET Q, a third resistor R3, and a LED D. A gate of the MOSFET Q is electrically coupled to the output terminal 213 and receives the control signal. A source of the MOSFET Q is electrically coupled to an anode of the LED D via the third resistor R3. A cathode of the LED D is grounded. A drain of the MOSFET Q is configured to receive the power on DC voltage Vdd. In at least one embodiment, the MOSFET Q is an N-channel MOSFET.

When a main power provided to the electronic device 400 is normal, the first anode 111 receives the standby DC voltage Vcc. The cathode 113 outputs a high voltage level first voltage level signal to the first input terminal 211.

If the electronic device 400 is turned on, the second input terminal 212 receives a high voltage level second voltage level signal via the second resistor R2. The control chip 210 records the first voltage level signal and the second voltage level signal are both high voltage level. The output terminal 213 outputs a low voltage level control signal to the gate of the MOSFET Q the next time the electronic device 400 is turned on. The MOSFET Q is turned off. The anode of the LED D cannot receive the power on DC voltage Vdd. The LED D does not emit light.

If the electronic device 400 is turned off, the power on DC voltage Vdd is cut off, the second input terminal 212 receives a low voltage level second voltage level signal via the second resistor R2. The control chip 210 records that only the second voltage level signal is low voltage level. The output terminal 213 outputs the low voltage level control signal to the gate of the MOSFET Q the next time the electronic device 400 is turned on. The MOSFET Q is turned off. The anode of the LED D cannot receive the power on DC voltage Vdd. The LED D does not emit light.

When the main power provided to the electronic device 400 is abnormal, the standby DC voltage Vcc and the power on DC voltage Vdd are both cut off. The second input terminal 212 receives the low voltage level second voltage level signal via the second resistor R2.

If there is electric charge in the battery 120, the second anode 112 receives the power supply from the battery 120 via the first resistor R1. The cathode 113 outputs the high voltage level first voltage level signal to the first input terminal 211. The control chip 210 records that only the second voltage level signal is low voltage level. The output terminal 213 outputs the low voltage level control signal to the gate of the MOSFET Q the next time the electronic device 400 is turned on. The MOSFET Q is turned off. The anode of the LED D can not receive the power on DC voltage Vdd. The LED D does not emit light.

If there is no electrical charge in the battery 120, the second anode 112 cannot receive the power supply from the battery 120 via the first resistor R1. The cathode 113 outputs a low voltage level first voltage level signal to the first input terminal 211. The control chip 210 records the first voltage level signal and the second voltage level signal are both low voltage level. The output terminal 213 outputs a high voltage level control signal to the gate of the MOSFET Q the next time the electronic device 400 is turned on. The MOSFET Q is turned on. The anode of the LED D receives the power on DC voltage Vdd. The LED D emits light and reminds the user to charge the battery 120.

The embodiments shown and described above are only examples. Many details are often found in the art such as the other features of an alarm system for power supply. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. An alarm system for power supply, the alarm system comprising:
    a power supply unit comprising a battery configured to output a power supply voltage, the power supply unit configured to receive a standby direct current (DC) voltage and output a first voltage level signal according to the power supply voltage and the standby DC voltage;
    an electronic device configured to output a second voltage level signal;
    a control unit coupled to the power supply unit and the electronic device and configured to receive the first voltage level signal and the second voltage level signal, and output a control signal in accordance therewith; and
    a switch unit coupled to the control unit and the electronic device and configured to receive the control signal, and alert when there is no electric charge in the battery.

2. The alarm system for power supply of claim 1, wherein the power supply unit further comprises a Schottky diode and a first resistor; the Schottky diode comprises a Schottky diode first anode, a Schottky diode second anode, and a Schottky diode cathode; the Schottky diode first anode is configured to receive the standby DC voltage; the Schottky diode second anode is electrically coupled to a battery anode via the first resistor; a battery cathode is grounded; and the Schottky diode cathode is configured to output the first voltage level signal.

3. The alarm system for power supply of claim 2, wherein the battery is a button cell; and the standby DC voltage is +3.3V.

4. The alarm system for power supply of claim 2, wherein the control unit comprises a control chip and a second resistor; the control chip comprises a first input terminal, a second input terminal, an output terminal, and a ground terminal; the first input terminal is electrically coupled to the Schottky diode cathode and receives the first voltage level signal; the second input terminal is electrically coupled to a power on DC voltage via the second resistor; the second input terminal is configured to receive the second voltage level signal; the output terminal is configured to output the control signal; and the ground terminal is grounded.

5. The alarm system for power supply of claim 4, wherein the power on DC voltage is +3V.

6. The alarm system for power supply of claim 4, wherein the switch unit comprises a metal oxide semiconductor field effect transistor (MOSFET), a third resistor, and a light emitting diode (LED); a MOSFET gate is electrically coupled to the output terminal and receive the control signal; a MOSFET source is electrically coupled to a LED anode via the third resistor; a LED cathode is grounded; and a MOSFET drain is configured to receive the power on DC voltage.

7. The alarm system for power supply of claim 6, wherein the MOSFET is an N-channel MOSFET.

8. The alarm system for power supply of claim 1, wherein when at least one of the first voltage level signal and the second voltage level signal received by the control unit is a high voltage level, the control unit outputs a low voltage level control signal to the switch unit, and the switch unit does not alert.

9. The alarm system for power supply of claim 1, wherein when the first voltage level signal and the second voltage level signal received by the control unit are both low voltage level, the control unit outputs a high voltage level control signal to the switch unit, and the switch unit alerts.

10. An alarm system for power supply, the alarm system comprising:
    a power supply unit comprising a battery configured to output a power supply voltage, the power supply unit configured to receive a standby DC voltage and output a first voltage level signal according to the power supply voltage and the standby DC voltage;
    an electronic device configured to output a second voltage level signal;
    a control unit coupled to the power supply unit and the electronic device and configured to receive the first voltage level signal and the second voltage level signal, and output a control signal in accordance therewith; and
    a switch unit coupled to the control unit and the electronic device and configured to receive the control signal, and alert when there is no electric charge in the battery,
    wherein, when at least one of the first voltage level signal and the second voltage level signal received by the control unit is a high voltage level, the control unit outputs a low voltage level control signal to the switch unit, and the switch unit does not alert; and
    when the first voltage level signal and the second voltage level signal received by the control unit are both low voltage level, the control unit outputs a high voltage level control signal to the switch unit, and the switch unit alerts.

11. The alarm system for power supply of claim 10, the power supply unit further comprises a Schottky diode and a first resistor; the Schottky diode comprises a Schottky diode first anode, a Schottky diode second anode, and a Schottky diode cathode; the Schottky diode first anode is configured to receive the standby DC voltage; the Schottky diode second anode is electrically coupled to a battery anode via the first resistor; a battery cathode is grounded; and the Schottky diode cathode is configured to output the first voltage level signal.

12. The alarm system for power supply of claim 11, wherein the battery is a button cell; and the standby DC voltage is +3.3V.

13. The alarm system for power supply of claim 11, wherein the control unit comprises a control chip and a second resistor; the control chip comprises a first input terminal, a second input terminal, an output terminal, and a ground terminal; the first input terminal is electrically coupled to the Schottky diode cathode and receives the first voltage level signal; the second input terminal is electrically coupled to a power on DC voltage via the second resistor; the second input terminal is configured to receive the second voltage level signal; the output terminal is configured to output the control signal; and the ground terminal is grounded.

14. The alarm system for power supply of claim 13, wherein the power on DC voltage is +3V.

15. The alarm system for power supply of claim 13, wherein the switch unit comprises a MOSFET, a third resistor, and a LED; a MOSFET gate is electrically coupled to the output terminal and receive the control signal; a MOSFET source is electrically coupled to a LED anode via the third resistor; a LED cathode is grounded; and a MOSFET drain is configured to receive the power on DC voltage.

16. The alarm system for power supply of claim 15, wherein the MOSFET is an N-channel MOSFET.

* * * * *